United States Patent
Wyse (12)

(10) Patent No.: US 6,357,295 B1
(45) Date of Patent: Mar. 19, 2002

(54) COUNTERBALANCED ROTATION RATE SENSOR

(75) Inventor: Stanley F. Wyse, Encino, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/628,217

(22) Filed: Jul. 28, 2000

(51) Int. Cl.[7] ............................. G01C 19/00; G01P 9/00
(52) U.S. Cl. ................................. 73/504.04; 73/504.13
(58) Field of Search ......................... 73/504.02, 504.03, 73/504.04, 504.12, 504.13

(56) References Cited

U.S. PATENT DOCUMENTS

| | | | | |
|---|---|---|---|---|
| 5,007,289 A | * | 4/1991 | Stewart et al. ................. | 73/510 |
| 5,065,627 A | * | 11/1991 | Stewart et al. ................. | 73/505 |
| 5,428,995 A | * | 7/1995 | Fersht et al. .................... | 73/504 |
| 5,932,803 A | * | 8/1999 | Wyse ...................... | 73/504.04 |
| 5,932,805 A | * | 8/1999 | Stewart ........................ | 73/510 |
| 6,041,652 A | * | 3/2000 | Stewart .................... | 73/504.04 |
| 6,085,590 A | * | 7/2000 | Stewart et al. ............ | 73/504.03 |
| 6,138,511 A | * | 10/2000 | Stewart ........................ | 73/510 |

* cited by examiner

Primary Examiner—Richard A. Moller
(74) Attorney, Agent, or Firm—Elliott N. Kramsky, Esq

(57) ABSTRACT

A sensor for measuring rotation rate with respect to three axes and linear acceleration with respect to two axes. Electromagnets comprising cores of high magnetic permeability and windings are fixed to structures that protrude inwardly from outer frames of upper and lower rotor assemblies. An element of high magnetic permeability is fixed to the facing surface of a rotor arm to create electromagnetic drives for counteroscillation of upper and lower sets of rotor arms. Accelerometers are horizontally aligned and fixed to the top surfaces of preselected rotor arms of the upper rotor assembly and to the bottom surfaces of aligned rotor arms of the lower set of rotor arms for measuring rotation rate with respect the x and y axes and linear acceleration with respect to the z axis. The two sets of rotor arms are connected by a torsion bar. A pair of accelerometers is each vertically aligned and fixed to the ends of aligned rotor arms of a rotor assembly for measuring rotation rate with respect to the z axis and linear acceleration with respect to the y axis. Each rotor assembly, comprising a central hub from which a set of four rotor arms radiate and a surrounding outer frame connected to the hub through a plurality of vanes, is formed of a single integral piece.

42 Claims, 3 Drawing Sheets

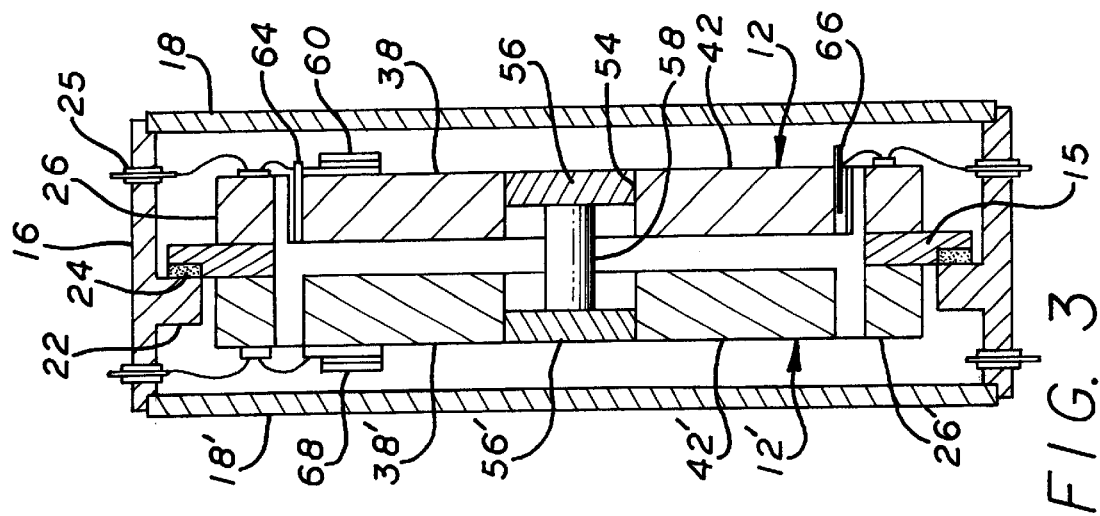
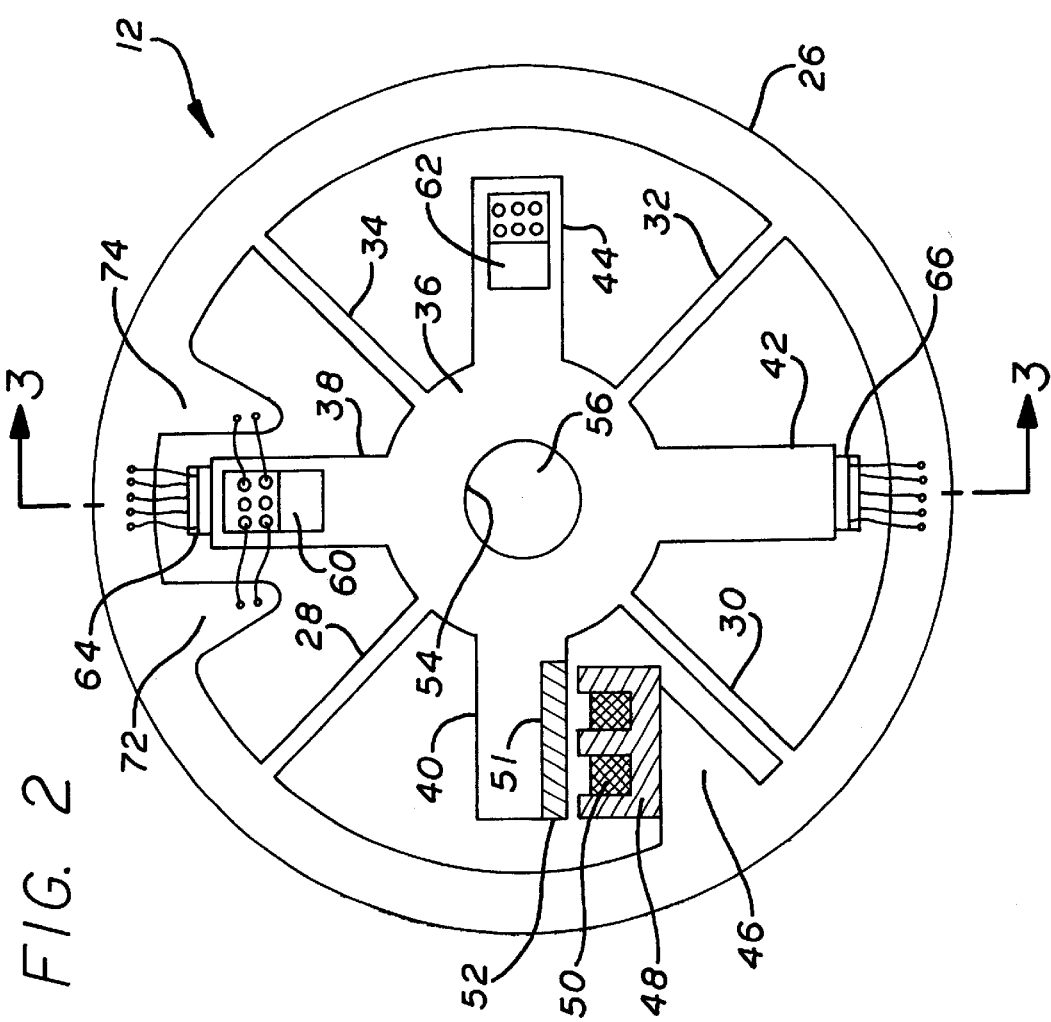

COUNTERBALANCED ROTATION RATE SENSOR

BACKGROUND

1. Field of the Invention

The present invention relates to counterbalanced systems capable of measuring rotation rates about multiple inertial axes. More particularly, this invention pertains to a system of the above type wherein counteroscillating rotors are electromagnetically driven.

2. Description of the Prior Art

Systems employing paired counteroscillating rotors have been utilized as relatively low-cost approaches to the measurement of rotation rates, and, in some cases, linear accelerations with respect to multiple inertial axes. For example, a system for measuring rotation rates (and accelerations) with respect to a set of three orthogonal axes utilizing a single drive mechanism is taught in a series of U.S. patents of Stewart and Fersht (U.S. Pat. No. 4,996,887 entitled "Three Axis Inertial Measurement Unit With Counterbalanced Mechanical Oscillator"; U.S. Pat. No. 5,007,289 entitled "Three Axis Inertial Measurement Unit With Counterbalanced, Low Inertial Mechanical Oscillator"; and U.S. Pat. No. 5,065,627 entitled "Three Axis Inertial Measurement Unit With Counterbalanced, Low Inertial Mechanical Oscillator.") The system disclosed in each of those patents employs a drive mechanism comprising of plurality of vanes having piezoelectric strips mounted thereon for affecting deflections that cause a pair of counterbalanced platforms to oscillate out-of-phase about a common axis within a housing or case. Closed-loop accelerometers are mounted about the peripheries of the platforms and oriented at predetermined angles with respect to the axis of oscillation that permit determination of angular rates, through measurement of the Coriolis accelerations, about three orthogonal axes as well as linear accelerations with respect to those axes.

Other devices are disclosed in U.S. Pat. No. 5,932,803 of Wyse entitled "Counterbalanced Triaxial Multisensor With Resonant Accelerometers", U.S. Pat. No. 5,932,805 of Stewart entitled "Multisensor With Directly Coupled Rotors" and U.S. Pat. No. 6,041,652 of Stewart entitled "Multisensor Rotor Flexure Mounting." Each of the above devices employs an arrangement of radially-directed drive beams for supporting a coaxial pair of rotors. In each case, the mechanism for driving the counteroscillating rotors or platforms relies upon inducing bending in the vanes by application of voltages to strips of piezoelectric material fixed to their opposed surfaces. The devices disclosed in those applications employ hinged accelerometers that are positioned at the ends of the rotor arms and oriented at angles to the planes of dither of the paired rotors to enable the devices to measure Coriolis and linear accelerations with respect to the three orthogonal inertial axes.

U.S. Pat. No. 5,428,995 of Fersht, Wyse, Stewart and Miller entitled "Counterbalanced Vibratory Triaxial Angular Rate Sensor With Open Loop Output" teaches a device for open loop measurement of rotation rates with respect to three orthogonal axes in which the arms of counteroscillating rotors are configured as open loop accelerometers. In each case, a pendulous mass is held at the end of a rotor arm formed of parallel surfaces, each of which comprises a composite of metallization and piezoelectric material layers in which the metallizations act as electrodes. As in the case of the devices described in the preceding paragraph, radial vanes, which support the rotors within surrounding frames, include strips of piezoelectric material at their opposed surfaces whereby the vanes may be induced to deflect in such a way as to cause desired oscillatory movements of the rotors.

Certain of the features common to the devices of the above-described type that employ counteroscillating rotor pairs introduce problems in terms of both performance and manufacture. By employing strips of piezoelectric material at opposed sides of driving vanes, one must attain great precision to assure that the overall device remains highly symmetric since piezoelectric material expands or contracts in all directions when a voltage is applied. Therefore, generated forces act in all directions, making it absolutely critical that a high degree of symmetry be obtained when mounting the piezoelectric elements to avoid the introduction of motion along the direction of the dither axis. Such motion will be identical to those motions caused by Coriolis accelerations under measurement. Gyro bias is highly sensitive to the manner in which the piezoelectric material is affixed to the multiple radial vanes that drive the rotors as out-of-plane forces are a major contributor to bias in a piezoelectric dither mechanization. Such out-of-plane forces may also be induced by twisting of the drive vanes which must therefore be relatively stiff, introducing stresses from radial stressing.

In addition, the forces required to maintain a given dither amplitude are proportional to the Q of the dither mode of vibration. The mounting of piezoelectric elements to the radial vanes decreases the Q of the resonant mode. As a result, higher driving forces are required, which, in turn, results in higher bias. Further, due to the complex and labor-intensive processes required for wiring multiple piezoelectric elements, such devices may be rendered uneconomical.

The mounting of accelerometers at an angle in the multisensor devices described above significantly complicates their manufacture and operation. Misalignment errors are critical in such devices as this may lead to the pickup of dither motion. In addition, angular mounting of accelerometers requires the use of complex geometrical transformation for evaluation of sensor output.

SUMMARY OF THE INVENTION

The present invention addresses the preceding and other shortcomings of the prior art by providing, in a first aspect, a sensor that includes a first rotor and a second rotor, each including a plurality of radially-directed rotor arms that extend from a central hub. Each of the rotors is received within an associated frame. A plurality of vanes connects each of the hubs to its associated frame. A torsion spring is fixed to the hub.

Each of the rotor arms comprises parallel upper and lower radially-directed planar surfaces and an orthogonal end surface. At least one accelerometer is fixed to at least one of the upper, lower and end surfaces.

In a second aspect, the invention provides a sensor that includes a first rotor and a second rotor, each including a plurality of radially-directed rotor arms that extend from a central hub. Each of the rotors is received within an associated frame. A plurality of vanes connects each of the hubs to its associated frame. A torsion spring is fixed to the hub.

An electromagnet is fixed to the interior of each of the frames. One of the rotor arms of each rotor includes a region of magnetic composition. Each rotor and associated frame is arranged so that the region of magnetic composition of a rotor arm is substantially adjacent the electromagnet. At least one accelerometer is fixed to at least one of the rotor arms.

In a third aspect, the invention provides a sensor having a first rotor and a second rotor, each being substantially planar and including a plurality of radially-directed rotor arms that extend from a central hub. The rotors are received within a frame. A plurality of vanes connects each of the hubs to the frame so that the rotors are substantially parallel to one another. A torsion spring is fixed to the hubs.

Each of the rotor arms comprises parallel, radially-directed planar upper and lower surfaces and an orthogonal end surface. At least one accelerometer is fixed to at least one of the upper, lower and end surfaces. The rotors are driven to counteroscillate about the torsion spring.

In a fourth aspect, the invention provides a sensor having a first rotor and a second rotor, each being substantially planar and including a plurality of radially-directed rotor arms that extend from a central hub. The rotors are received within a frame. A plurality of vanes connects each of the hubs to the frame so that the rotors are substantially parallel to one another. A torsion spring is fixed to the hubs.

A pair of electromagnets is fixed to the interior of the frame. One of the rotor arms of each rotor includes a region of magnetic composition. Each rotor is arranged so that a region of magnetic composition of a rotor arm is adjacent the electromagnet. At least one accelerometer is fixed to at least one of the rotor arms.

The various features and advantages of this invention will become further apparent from the detailed description that follows. Such description is accompanied by a set of drawing figures. Numerals of the drawing figures, corresponding to those of the written description, point to the various features of the invention. Like numerals refer to like features throughout both the drawing figures and the written description.

BRIEF DESCRIPTION OF THE DRAWINGS

FIG. 2 is a top plan view of the a rotor assembly of the present invention;

FIG. 3 is a cross-sectional side elevation view of the assembled invention taken at line 3—3 of FIG. 2.

DETAILED DESCRIPTION OF THE PREFERRED EMBODIMENT

Figure 1:
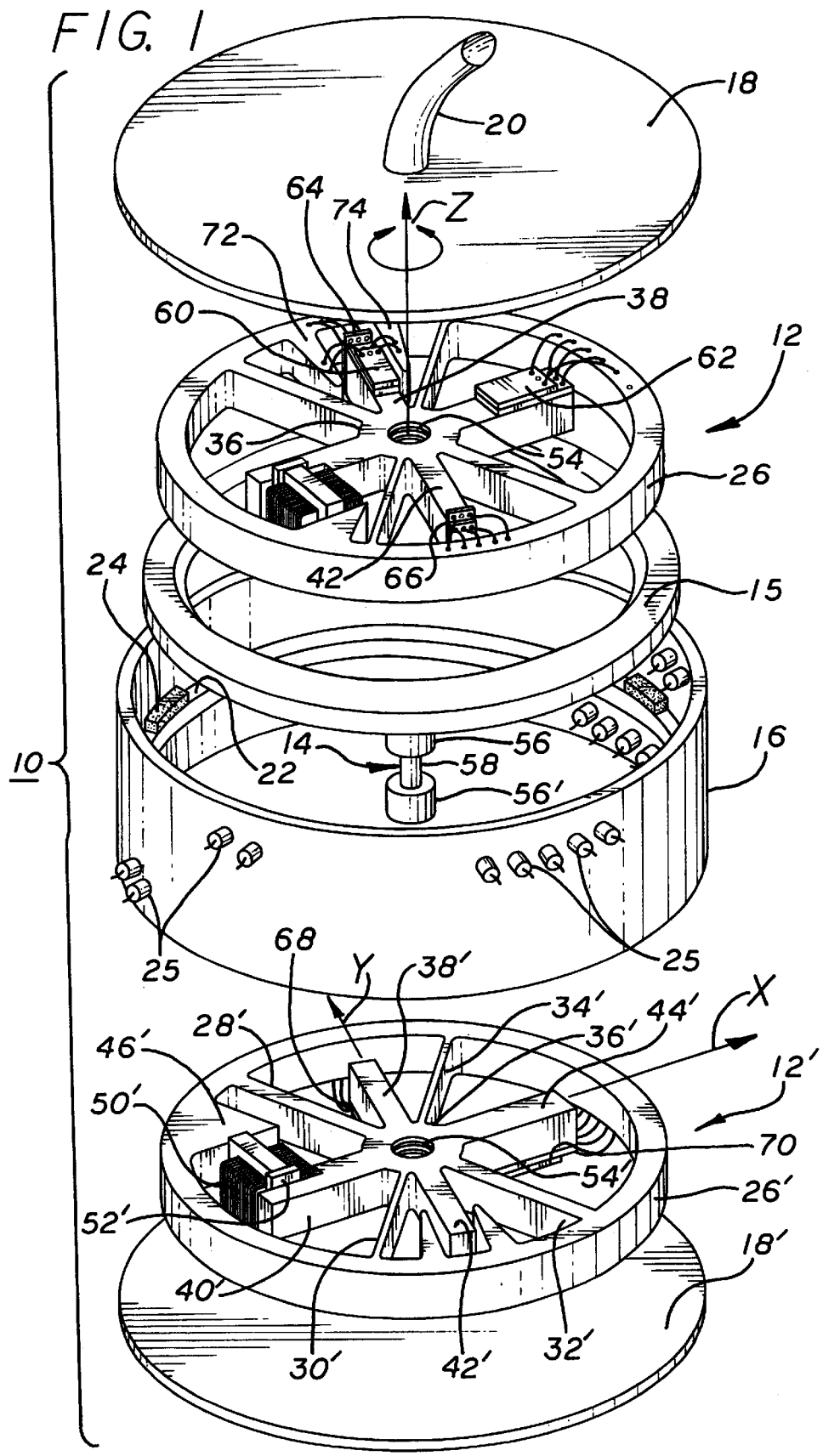
FIG. 1 is an exploded perspective view of the sensor of the invention.

FIG. 1 is an exploded perspective view of the sensor 10 of the invention. It comprises an easy-to-manufacture device that includes a pair of structurally-similar rotor assemblies 12 and 12' that are coupled to one another by means of a flexure 14. The rotor assemblies 12 and 12' are preferably fabricated of titanium or like material of high strength and relatively low mass. The flexure 14 is preferably of titanium or other resilient material for establishing a predetermined resonant frequency of the spring-mass system formed of the mechanism of the rotor assemblies 12, 12' and the flexure 14 that joins them. Such mechanism is attached through a mounting ring 15 to a case comprising a surrounding cylindrical wall 16 and top and bottom covers 18 and 18' respectively. The wall 16 and covers 18, 18' are sealably secured to one another with a fill tube 20 provided for evacuation of the interior of the sensor case.

An interior annular ridge 22, with compliant mounting pads 24 adhesively fixed thereto, is provided for isolation of the dynamic sensor mechanism, comprising the rotor assemblies 12, 12', the mounting ring 15 and the flexure 14, from the environment. Feedthroughs 25 are suitably located within the cylindrical wall 16 for facilitating necessary communication between electronic circuitry exterior to the case and various elements mounted to the assemblies 12, 12'.

Referring to FIGS. 1 and 2, a top plan view of the rotor assembly 12, in combination, with reference being made solely to structures of the upper rotor assembly 12 (it being understood that like structures, indicated by like primed numerals, are associated with the lower rotor assembly 12'), the assembly 12 can be seen to comprise an integral spoke-and-wheel arrangement that defines an outer frame 26, a plurality of radially-directed support vanes 28 through 34 and a central hub 36 from which a plurality of rotor arms 38 through 44, interspersed between the support vanes, radiate. A triangular ledge 46 protrudes inwardly from the outer frame 26. The ledge 46 is provided for receiving a core 48 preferably of ferrite or other high magnetic permeability material. Associated coil windings 50 on the core 48 complete an electromagnet. The lateral dimension of the rotor arm 40 is reduced by the removal of a slab-like portion to form a notch 51 in the region that faces the electromagnet affixed to the triangular ledge 46. The notch 51 is filled by an element 52 of high magnetic permeability material, such as ferrite, which is bonded to the rotor arm 40. As will be described below, the electromagnet fixed to the rotor assembly 12 (and, of course, a like structure indicated by primed numerals that is fixed to the rotor assembly 12') interact with the high magnetic permeability elements 52, 52'. The magnetic field generated by the current-driven coil wound about a leg of the ferrite core produces forces solely in the plane of dither motion to drive the associated sets of rotor arms to counteroscillate. Such forces are relatively low as a result of the high Q obtained from suitably treated titanium (or other appropriate material for the flexure 14). The resultant negligible out-of-plane motion reduces axial forces over piezo-driven rotors by two or three orders of magnitude. (It should be noted that, for an accelerometer having a peak dither velocity of 20 inches/sec, a single pico-inch of out-of-plane motion at a dither frequency of 2200 Hz generates the equivalent of one degree per hour of Coriolis acceleration.) This is in contrast to the prior art in which rotors are driven by the coordinated bending of support vanes induced by voltages applied to attached strips of piezoelectric material.

Each rotor assembly 12, 12' comprises identical integral structures (consisting of hubs 36, 36', outer frames 26, 26', vanes 28 through 34, 28' through 34', triangular ledges 46, 46' and rotor arms 38 through 44, 38' through 44') preferably of titanium or like material characterized by high strength and durability, light weight and high Q with various functional elements, such as the above-described electromagnets and accelerometers (described below) bonded thereto. Such basic integral is structures are readily amenable to batch manufacturing processes that significantly reduce costs. By employing appropriate processes, it is possible to form multiple Pairs of such basic integral structures during a single processing operation. In particular, multiple rotors can be formed from a sandwich of two or more titanium plates that can be wire Electric Discharge Machined (EDM). For example, the rotor pattern illustrated in FIG. 2 may be imposed through all the plates at a single time with the pattern repeated many times spaced throughout each of the planar plates. Thereafter, the pieces can be separated and bonded together at outer frames 16 and 16' through common bonding rings 15 to create multiple dual rotor assemblies, each arranged as that of FIG. 1. When one of such resultant basic integral rotor structures is inverted with respect to the other (as an adjunct to affixation to the opposed ends of the flexure 14 and bonding to a mounting ring 15), an arrangement and relative orientation of the paired rotor assemblies 12, 12' is obtained.

Referring now to both of the rotor assemblies 12 and 12', apertures 54, 54' within the central hubs 36, 36' of the rotor assemblies 12 and 12' are provided for receiving the opposed anchor ends 56, 56', respectively, of the flexure 14. A torsion bar 58 comprises an intermediate region of reduced diameter of the elongated flexure 14. The flexure assembly 14 is preferably a single machined piece with its composition and dimensions (particularly that of the torsion bar 58) chosen in relation to the preferred resonant frequency of counteroscillation of the rotor assemblies 12 and 12' in operation. The anchor ends 56 and 56' are accommodated and bonded with the apertures 54 and 54' respectively by means of an appropriate adhesive such as EPOXY. While the torsion bar 58 is preferably cylindrical, it is also amenable to other cross sectional geometries such as square, cross-shaped and polygonal. Torsion bars of different diameters can be made such that any desired dither frequency can be readily achieved. In fact, the torsion bar 58 may be hollowed down the center for adjustment of dither frequency. In fact, dither frequency may even be adjusted in place by reaming out the center of the torsion bar 58.

The flexure assembly 14 serves both to tune and lock together any axial motions of the rotor assemblies 12 and 12' and eliminates any need for stiff drive vanes that may become nonlinear with dither amplitude or serve as a source of flicker noise in prior art designs. Rather, vanes 28 through 34 and 28' through 34' need only be stiff enough to support the sets of rotor arms of the upper and lower rotor assemblies 12 and 12' respectively to eliminate any rocking motion about the radial input axes.

By referring to FIG. 1 in combination with FIG. 3, a side elevation view of the assembled sensor of the invention taken at line 3—3 of FIG. 2, one may observe that plurality of accelerometers are fixed to the rotor assemblies 12 and 12'. Referring first to the upper rotor assembly 12, accelerometers 60 and 62 are fixed to the top surfaces of the orthogonal rotor arms 38 and 44 respectively while accelerometers 64 and 66 are fixed to the ends of the aligned rotor arms 38 and 42 respectively. Turning to the lower rotor assembly 12', an accelerometer 68 is mounted to the bottom surface of the rotor arm 38' and an accelerometer 70 is fixed to the bottom surface of the rotor arm 44'. Landings 72 and 74 that project inwardly from the outer frame 26 provide a means for locating contact pads for the electrical conductors that transmit signals to and outputs from the accelerometer 60. As mentioned earlier, such signals and outputs are eventually transmitted to exterior electronics through appropriate feedthroughs 25 in the cylindrical wall 16 of the sensor case.

Each of the accelerometers is preferably of silicon and of the hinged type disclosed in U.S. Pat. No. 5,932,803 of Stanley F. Wyse titled "Counterbalanced Triaxial Multisensor With Resonant Accelerometers". The teachings of such patent, property of the Assignee herein, are hereby incorporated by reference. By utilizing silicon accelerometers, one is able to measure the d.c. component of motion of the pendulous mass due to linear acceleration, enabling the measurement of such acceleration with respect to two axes (the y and z axes of FIG. 1).

The arrangement of accelerometers provides the sensor 10 with the capability of measuring three axes of angular rate about the orthogonal space axes in addition to linear accelerations along two axes. Full common mode rejection for vibration inputs is attained for the angular rate measurements. When driven by the electromagnets fixed to the upper and lower rotor assemblies 12 and 12' to counteroscillate, the hinged pendulous masses of each of the accelerometers 62 and 70 senses a Coriolis force, at the frequency of oscillation of the attached rotor arm, that is proportional to rotation about the indicated "x" axis. The counteroscillation of the two rotors 12 and 12', coupled with the symmetrically-opposed locations of the accelerometers 62 and 70 (note: the accelerometers are preferably identical in dimension and form with the hinges and centers of gravity of their pendulous masses aligned along the z axis) assures common-mode rejection of bias errors due to linear or angular vibration inputs. That is, the two accelerometers 62 and 70 generate equal outputs for vibration inputs while generating equals outputs of opposite polarities for angular rate inputs. Thus, when the two accelerometer outputs are differenced to obtain a relatively-large signal for rate inputs, the output from vibration inputs will be nulled.

Similarly, the symmetrically-opposed accelerometers 60 and 68 fixed to the top surface of the rotor arm 38 and to the bottom surface of the rotor arm 38' respectively sense rotation about the indicated "y" axis, and will also provide common mode rejection of vibration inputs.

The accelerometers 64 and 66 are identically fixed to the ends of the aligned rotor arms 38 and 42 (i.e. with all like accelerometer features and structures, including the centers of gravity of the pendulous masses aligned through the aligned rotor arms 38 and 42) to measure rotations about the indicated "z" axis. By mounting the two z axis accelerometers on only the upper rotor assembly 12 such that their input axes are collinear, the measurement of rotation about the z axis can be accomplished with common mode rejection of vibration inputs.

As taught in U.S. Pat. No. 5,932,803, the accelerometers 60 through 70 are preferably chosen and/or tuned (by application of bias voltages) whereby their natural frequencies are equal to the dither frequency established primarily by the rotor assemblies' resonant frequency which is driven by current signals applied to the coils 50, 50'. In this way, a Coriolis acceleration measurement of rotation rate of maximum signal-to-noise ratio is obtained.

Figure 4:
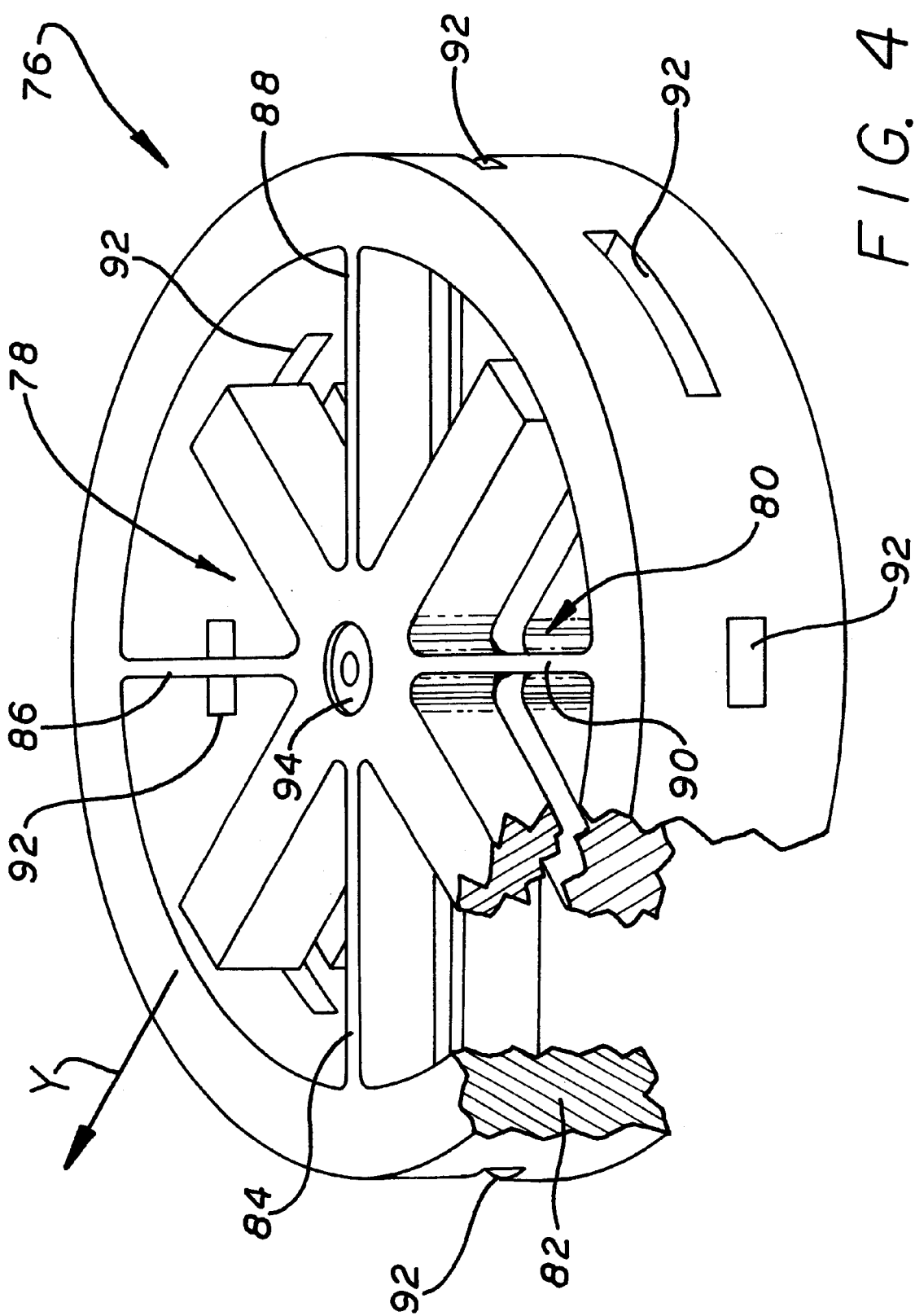
FIG. 4 is a perspective view of an alternative embodiment of the invention with selected elements removed for clarity of illustration.

FIG. 4 is a perspective view of an alternative embodiment of the invention. The electromagnets and accelerometers of the prior embodiment have been removed for purposes of clarity. It will be understood that like assemblies are intended to be similarly engaged to the structures illustrated in FIG. 4 to form a complete, operational device in accordance with the invention.

Returning to FIG. 4, such embodiment differs from that of the prior embodiment in that it comprises a single part 76, preferably of titanium, formed by EDM processes to form an upper set 78 of rotor arms and a lower set 80 of rotor arms. A single outer frame 82 surrounds both the upper and lower sets of rotor arms 78 and 80. The structure of FIG. 4 is formed by first defining the outer frame 82, a set of rotor arms and support vanes 84 through 90 by cutting the titanium exclusively along a vertical plane and then, using EDM, separating the upper and lower sets of rotors 78, 80 and vanes by cutting along a horizontal plane that bisects the thickness of the structure. Apertures 92 within the integral outer frame 82 indicate the points at which the EDM process was employed to make the necessary cuts along the horizontal plane.

After the upper and lower rotor arms and vanes have been separated, the hubs of the upper and lower rotor assemblies are then joined by means of a flexure 94 of appropriate dimension and composition.

The sensor of the invention is capable of measurement of not only rotation rate about three orthogonal axes (via Coriolis acceleration) but also linear acceleration with respect to two axes. As a result, the device is readily extended to operate as a multisensor through the fixation of an accelerometer to the case along the third axis for measuring acceleration. This is to be contrasted with the device of U.S. Pat. No. 5,428,995 which is only capable of measuring rotation rate as its rotor arms which serve as accelerometers and include piezoelectric structures are incapable of measuring the d.c. component of acceleration since the charge generated by rotor arm flexure floats, and eventually leaks to the ground.

Thus it is seen that the present invention provides a rotation rate sensor capable of measuring rotation rate with respect to three orthogonal axes and acceleration with respect to two axes. Straightforward addition of an accelerometer permits the device to function as a complete multisensor.

By employing the teachings of the invention, one may avoid the problems associated with the piezoelectric drives of the prior art. By utilizing an electromagnetic drive, one needn't deal with the criticality of symmetrical mounting of piezoelectric strips to avoid introduction of motion along the direction of the dither axis, with attendant gyro bias.

The elimination of any need to mount piezoelectric strips along the drive vanes also eliminates a source known to reduce the Q of the resonant sensor mode. Additionally, manufacture is simplified by the mounting of the accelerometers along the planar rotor arms (whose mounting surfaces comprise parallel, radially-directed upper and lower planar surfaces and an orthogonal end surface) rather than at angles. Again misalignment errors can result in the pickup of dither motion. Further, the orthogonal mounting of accelerometers eliminates any need for complex geometrical transformations to evaluate sensor output.

While this invention has been described with reference to its presently-preferred embodiment, it is not limited thereto. Rather, this invention is limited only insofar as it is described by the following set of patent claims and includes within its scope all equivalents thereof.

What is claimed is:

1. A sensor comprising, in combination:
   a) a first rotor and a second rotor, each of said rotors including a plurality of radially-directed rotor arms that extend from a central hub;
   b) each of said rotors being received within an associated frame;
   c) a plurality of vanes connecting each of said hubs to said associated frames;
   d) a torsion spring being fixed to said hubs;
   e) each of said rotor arms comprising parallel upper and lower, radially-directed planar surfaces and an orthogonal end surface;
   f) at least one accelerometer fixed to at least one of said upper, lower and end surfaces; and
   g) said rotors being driven to counteroscillate about said torsion spring.

2. A sensor as defined in claim 1 further including:
   a) an electromagnet fixed to the interior of each of said frames;
   b) one of said rotor arms of each of said rotors including a region of magnetic composition; and
   c) each of said rotors and associated frames being arranged so that a region of magnetic composition is adjacent an electromagnet.

3. A sensor as defined in claim 2 further characterized in that:
   a) each of said frames is generally annular;
   b) each of said frames includes an inwardly-directed region; and
   c) an electromagnet is fixed to said inwardly-directed region.

4. A sensor as defined in claim 3 wherein said region of magnetic composition comprises a substantially planar element of high magnetic permeability.

5. A sensor as defined in claim 4 wherein said substantially-planar element of high magnetic permeability faces an electromagnet.

6. A sensor as defined in claim 5 wherein said facing surface of said substantially-planar element of high magnetic permeability is radially-directed.

7. A sensor as defined in claim 6 wherein said substantially-planar element of high magnetic permeability comprises ferrite.

8. A sensor as defined in claim 1 wherein each of said rotors, associated vanes and frame comprises a distinct integral unit.

9. A sensor as defined in claim 8 wherein each said of said distinct integral structures comprises titanium.

10. A sensor as defined in claim 1 wherein said torsion spring includes a central torsion bar and opposed anchor ends for engaging said hubs.

11. A sensor as defined in claim 10 wherein each of said anchor ends is of greater cross sectional area than said torsion bar.

12. A sensor as defined in claim 11 wherein said torsion spring comprises an integral element.

13. A sensor as defined in claim 12 wherein said end anchors are fixed to said hubs by mean of adhesive.

14. A sensor as defined in claim 13 wherein said adhesive is EPOXY.

15. A sensor comprising, in combination:
   a) a first rotor and a second rotor, each of said rotors including a plurality of radially-directed rotor arms that extend from a central hub;
   b) each of said rotors being received within an associated frame;
   c) a plurality of vanes connecting each of said hubs to said associated frames;
   d) a torsion spring being fixed to said hubs;
   e) an electromagnet fixed to the interior of each of said frames;
   f) one of said rotor arms of each of said rotors including a region of magnetic composition;
   g) each of said rotors and associated frames being arranged so that a region of magnetic composition is adjacent an electromagnet; and
   h) at least one accelerometer fixed to at least one of said rotor arms.

16. A sensor as defined in claim 15 further characterized in that:
   a) each of said frames is generally annular;
   b) each of said frames includes an inwardly-directed region; and
   c) an electromagnet is fixed to said inwardly-directed region.

17. A sensor as defined in claim 15 wherein said region of magnetic composition comprises a substantially planar element of high magnetic permeability.

18. A sensor as defined in claim 17 wherein said substantially-planar element of high magnetic permeability faces an electromagnet.

19. A sensor as defined in claim 18 wherein said facing surface of said substantially-planar element of high magnetic permeability is radially-directed.

20. A sensor as defined in claim 19 wherein said substantially-planar element of high magnetic permeability comprises ferrite.

21. A sensor as defined in claim 15 further characterized in that:
   a) each of said rotor arms comprises parallel upper and lower, radially-directed planar surfaces and an orthogonal end surface; and
   b) said at least one accelerometer being fixed to at least one of said upper, lower and end surfaces.

22. A sensor comprising, in combination:
   a) a first rotor and a second rotor, each of said rotors being substantially planar and including a plurality of radially-directed rotor arms that extend from a central hub;
   b) said rotors being received within a frame;
   c) a plurality of vanes connecting each of said hubs to said frame so that said rotors are substantially parallel to one another;
   d) a torsion spring being fixed to said hubs;
   e) each of said rotor arms comprising parallel upper and lower radially-directed planar surfaces; and
   f) at least one accelerometer fixed to at least one of said upper, lower and end surfaces.

23. A sensor as defined in claim 22 further including:
   a) a pair of electromagnets fixed to the interior of said frame;
   b) one of said rotor arms of each of said rotors including a region of magnetic composition; and
   c) each of said rotors being arranged so that a region of magnetic composition is adjacent each of said electromagnets.

24. A sensor as defined in claim 23 further characterized in that:
   a) said frame is generally annular and includes a pair of inwardly-directed regions; and
   b) an electromagnet is fixed to each of said inwardly-directed regions.

25. A sensor as defined in claim 24 wherein each of said regions of magnetic composition comprises a substantially planar element of high magnetic permeability.

26. A sensor as defined in claim 25 wherein each of said substantially-planar elements of high magnetic permeability faces an electromagnet.

27. A sensor as defined in claim 26 wherein said facing surface of said substantially-planar element of high magnetic permeability is radially-directed.

28. A sensor as defined in claim 27 wherein said substantially-planar element of high magnetic permeability comprises ferrite.

29. A sensor as defined in claim 22 wherein said rotors, associated vanes and frame comprises an integral unit.

30. A sensor as defined in claim 29 wherein said integral unit comprises titanium.

31. A sensor as defined in claim 22 wherein said torsion spring includes a central torsion bar and opposed anchor ends for engaging said hubs.

32. A sensor as defined in claim 31 wherein each of said anchor ends is of greater cross sectional area than said torsion bar.

33. A sensor as defined in claim 32 wherein said torsion spring comprises an integral element.

34. A sensor as defined in claim 33 wherein said end anchors are fixed to said hubs by means of adhesive.

35. A sensor as defined in claim 34 wherein said adhesive is EPOXY.

36. A sensor comprising, in combination:
   a) a first rotor and a second rotor, each of said rotors being substantially planar and including a plurality of radially-directed rotor arms that extend from a central hub;
   b) said rotors being received within a frame;
   c) a plurality of vanes connecting each of said hubs to said frame so that said rotors are substantially parallel to one another;
   d) a torsion spring being fixed to said hubs;
   e) a pair of electromagnets fixed to the interior of said frame;
   f) one of said rotor arms of each of said rotors including a region of magnetic composition;
   g) each of said rotors being arranged so that a region of magnetic composition is adjacent each of said electromagnets; and
   h) at least one of accelerometer fixed to at least one of said rotor arms.

37. A sensor as defined in claim 36 further characterized in that:
   a) said frame is generally annular and includes a pair of inwardly-directed regions; and
   b) an electromagnet is fixed to each of said inwardly-directed regions.

38. A sensor as defined in claim 37 wherein each of said regions of magnetic composition comprises a substantially planar element of high magnetic permeability.

39. A sensor as defined in claim 38 wherein each of said substantially-planar elements of high magnetic permeability faces an electromagnet.

40. A sensor as defined in claim 39 wherein said facing surface of said substantially-planar element of high magnetic permeability is radially-directed.

41. A sensor as defined in claim 40 wherein said substantially-planar element of high magnetic permeability comprises ferrite.

42. A sensor as defined in claim 36 further including:
   a) each of said rotor arms comprising parallel upper and lower radially-directed planar surfaces; and
   b) at least one accelerometer fixed to at least one of said upper, lower and end surfaces.

* * * * *